3,764,338
SPECTRAL SENSITIZATION OF DIRECT-POSITIVE
SILVER-HALIDE EMULSIONS
Henri Depoorter, Mortsel, and Felix Jan Moelants, Wilrijk, Belgium, assignors to Agfa-Gevaert N.V., Mortsel, Belgium
No Drawing. Filed Mar. 22, 1972, Ser. No. 237,002
Claims priority, application Great Britain, Apr. 8, 1971, 9,095/71
Int. Cl. G03c 1/10, 1/36
U.S. Cl. 96—101
10 Claims

ABSTRACT OF THE DISCLOSURE

A direct-positive silver halide emulsion comprising fogged silver halide is described wherein said emulsion is spectrally sensitized by means of a dye corresponding to one of the formulae:

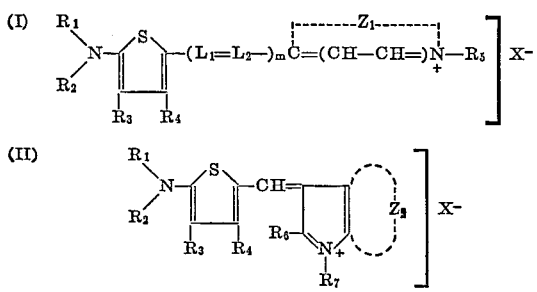

wherein:

each of $R_1$ and $R_2$ represents $C_1$–$C_5$ alkyl or together represent the atoms necessary to complete a morpholine, piperidine, or pyrrolidine ring,
each of $R_3$ and $R_4$ represents hydrogen, an alkyl group or an aryl group,
each of $L_1$ and $L_2$ represents a methine group,
$n$ represents 0 or 1,
$m$ represents 1 or 2,
each of $R_5$ and $R_7$ represents a saturated or unsaturated aliphatic group or an aromatic group,
$R_6$ represents an aryl group, or a heterocyclic aromatic group,
$Z_1$ stands for the non-metallic atoms necessary to complete a 5- or 6-membered heterocyclic nucleus containing nitrogen, which nucleus may carry a fused-on benzene or naphthalene ring,
$Z_2$ represents the atoms necessary to complete a fused-on benzene ring, and
X stands for an anion but is not present when $L_1$, $L_2$, $R_5$, or $R_7$ contains an anionic group.

The present invention relates to the spectral sensitization of direct-positive photographic silver halide emulsions.

Direct-positive materials containing fogged silver halide emulsions that upon image-wise exposure and development produce positive images are well known.

For the spectral sensitization of negative type silver halide emulsions there is a wide choice of spectrally sensitizing dyes such as mono- and trimethine cyanines, rhodacyanines, hemicyanines, merocyanines, styryl dyes, oxonol dyes, etc. Most of these dyes, however, are unsuitable for the spectral sensitization of direct-positive emulsions.

The choice of really suitable sensitizing dyes for direct-positive emulsions is rather poor and therefore novel spectrally sensitizing dyes for direct-positive emulsions are still needed and sought after.

In accordance with the present invention methine dyes are provided, which are particularly suitable for the sensitization of direct-positive silver halide emulsions. The cathodic and anodic polarographic half-wave potentials of these dyes are such that in negative type silver halide emulsions they have only a very slight sensitizing effect or even a desensitizing effect.

The methne dyes for use according to the invention correspond to the following formulae:

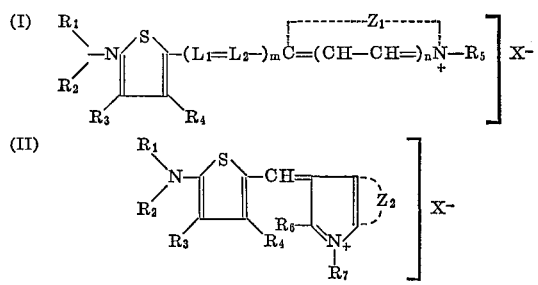

wherein:

each of $R_1$ and $R_2$ stands for $C_1$–$C_5$ alkyl, e.g. ethyl or together represent the atoms necessary to complete a morpholine, piperidine, or pyrrolidine ring,
each of $R_3$ and $R_4$ represents hydrogen, alkyl, substituted alkyl, aryl or substituted aryl,
each of $L_1$ and $L_2$ represents a methine group or substituted methine group,
$m$ represents 1 or 2,
$n$ represents 0 or 1,
each of $R_5$ and $R_7$ represents a substituent of the type contained in cyanine dyes on the cyanine nitrogen atom, e.g. a saturated or unsaturated aliphatic group or an aromatic group, e.g. alkyl, substituted alkyl, cycloalkyl, allyl, aralkyl, substituted aralkyl, aryl or substituted aryl; examples of specific groups for $R_5$ and $R_7$ are methyl, ethyl, propyl, isopropyl, butyl, β-hydroxyethyl, β-acetoxyethyl, carboxymethyl and carboxyethyl as described in German patent specification 704,141, filed Mar. 8, 1938, by I. G. Farbenindustrie A.G., sulphoethyl, sulphopropyl, and sulphobutyl as described in United Kingdom patent specification 742,112, filed Oct. 23, 1952, by Agfa AG für Photofabrikation, sulphatopropyl and sulphatobutyl as described in French patent specification 1,149,769, filed May 14, 1956, by VEB Filmfabric Agfa-Wolfen, the group

—ACOOBSO₂OH wherein A and B each represents a hydrocarbon group as set forth in United Kingdom patent specification 886,271, filed June 20, 1957, by Gevaert Photo-Producten N.V., e.g. sulphomethoxycarbonylmethyl, ω-sulphopropoxycarbonylmethyl, ω-sulphobutoxycarbonylmethyl and p(ω-sulphobutoxycarbonyl)benzyl, the group

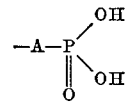

wherein A represents a hydrocarbon group as described in the United Kingdom patent specification 886,270, filed June 24, 1957, by Gevaert Photo-Producten N.V., the group —A—W—NH—V—B wherein A represents a methylene group, ethylene group, propylene group, or butylene group, B represents alkyl, amino, or substituted amino and may be hydrogen when V is a single bond, and each of W and V represents a carbonyl group, a sulphonyl group, or a single bond, at least one of W and V being sulphonyl, as set forth in United Kingdom patent specification 904,332, filed July 5, 1957, by Gevaert Photo-Producten N.V., e.g. N-(methylsulphonyl)carbamylmethyl, γ - (acetylsulphamyl)-proyl and δ-(acetylsulphamyl)butyl, cyclohexyl, allyl, benzyl, carboxybenzyl, sulphobenzyl, phenyl, and carboxyphenyl, $R_6$ stands for an aromatic group, e.g. phenyl, phenyl substituted by alkyl e.g. methyl and ethyl, aryl e.g. phenyl, alkoxy e.g. methoxy and ethoxy, or halogen e.g. chlorine and bromine, or a heterocyclic group such as pyridine, $Z_1$ stands for the non-metallic atoms necessary to complete a 5- or 6-membered heterocyclic nucleus containtaining nitrogen, which nucleus may carry a fused-on benzene or naphthalene ring and further substituents; these heterocycles are of the type known in cyanine dye chemistry and include those of the thiazole series e.g. thiazole, 4-methylthiazole, 4-phenylthiazole, 5-methylthiazole, 5-phenylthiazole, 4,5-dimethylthiazole, 4,5-diphenylthiazole, 4 - (2 - thienyl)-thiazole, those of the benzothiazole series, e.g. benzothiazole, 5-chlorobenzothiazole, 5-methylbenzothiazole, 6-methylbenzothiazole, 5,6 - dimethylbenzothiazole, 5 - bromobenzothiazole, 5-phenylbenzothiazole, 5-methoxybenzothiazole, 6-methoxybenzothiazole, 4,5,6,7-tetrahydrobenzothiazole, 5,6-dimethoxybenzothiazole, 5,6-dioxymethylenebenzothiazole, 5-hydroxybenzothiazole, 6-hydroxybenzothiazole, 5-ethoxycarbonyl benzothiazole, 5-acetylbenzothiazole, 5 - benzoylbenzothiazole, 5 - cyanobenzothiazole, 5-trifluoromethylbenzothiazole, 6-nitrobenzothiazole, 5-trifluoromethylsulfonylbenzothiazole, those of the naphthothiazole series, e.g. naphtho[2,1-d]thiazole, naphtho[1,2-d]thiazole, 5 - methoxynaphtho[1,2-d]thiazole, 5-ethoxynaphtho[1,2 - d]thiazole, 8 - methoxynaphtho[2,1 - d]thiazole, 7 - methoxynaphtho[2,1 - d]thiazole, those of the thionaphtheno[7,6-d]thiazole series, e.g. 7-methoxy-thionaphtheno[7,6-d]thiazole, those of the oxazole series, e.g. 4-methyloxazole, 5-methyloxazole, 4 - phenyloxazole, 4,5-diphenyloxazole, 4-ethyloxazole, 4,5-dimethyloxazole, 5-phenyloxazole, those of the benzoxazole series, e.g. benzoxazole, 5-chlorobenzoxazole, 5 - methylbenzoxazole, 5-phenylbenzoxazole, 6-methylbenzoxazole, 5,6-dimethylbenzoxazole, 5-methoxybenzoxazole, 6 - methoxybenzoxazole, 5 - hydroxybenzoxazole, 6-hydroxybenzoxazole, 5-benzoyl benzoxazole, 5-carboxybenzoxazole, those of the naphthoxazole series, e.g. naphtho[2,1 - d]oxazole, naphtho[1,2 - d]oxazole, those of the selenazole series, e.g. 4-methylselenazole, 4-phenylselenazole, those of the benzoselenazole, series e.g. benzoselenazole, 5-chlorobenzoselenazole, 5-methylbenzoselenazole, 5,6-dimethylbenzoselenazole, 5-methoxybenzoselenazole, 5 - methyl-6-methoxybenzoselenazole, 5,6 - dioxymethylenebenzoselenazole, 5 - hydroxybenzoselenazole, 4,5,6,7 - tetrahydrobenzoselenazole, those of the naphthoselenazole series, e.g. naphto[2,1-d]selenazole, naphtho[1,2-d]selenazole, those of the thiazoline series, e.g. thiazoline, 4-methylthiazoline, 4-hydroxymethyl - 4-methylthiazoline, 4,6-bis-hydroxymethylthiazoline, those of the oxazoline series, e.g. oxazoline, those of the selenazoline series, e.g. selenazoline, those of the 2-quinoline series, e.g. quinoline, 6-methylquinoline, 6-chloroquinoline, 6-methoxyquinoline, 6-ethoxyquinoline, 6-hydroxyquinoline, those of the 4-quinoline series, e.g. quinoline, 6-methoxyquinoline, 7-methylquinoline, 8-methylquinoline, those of the 1-isoquinoline series, e.g. isoquinoline, 3,4-dihydroisoquinoline, those of the 3-isoquinoline series, e.g. isoquinoline, those of the 2-pyridine series, e.g. pyridine, 5-methylpyridine, those of the 3,3-dialkylindolenine series, e.g. 3,3-dimethylindolenine, 3,3-dimethyl-5-chloroindolenine, 3,3,5-trimethylindolenine, 3,3,7-trimethylindolenine, those of the benzimidazole series, e.g. benzimidazole, 5,6-dichlorobenzimidazole, 5-chlorobenzimidazole, 5,6-dibromobenzimidazole, 5 - phenylbenzimidazole, 5 fluorobenzimidazole, 5,6-difluorobenzimidazole, 5-cyanobenzimidazole, 5,6-dicyanobenzimidazole, 5-chloro-6-cyanobenzimidazole, 5-fluoro-6-cyanobenzimidazole, 5-acetylbenzimidazole, 5-carboxybenzimidazole, 5-ethoxycarbonylbenzimidazole, 5 - sulphamylbenzimidazole, 5 - N-ethyl sulphamylbenzimidazole, 5 - ethylsulphonylbenzimidazole and 5-trifluoromethylsulphonylbenzimidazole, etc.

$Z_2$ represents the atoms necessary to complete a fused on benzene ring, which may be substituted by, e.g. alkyl, alkoxy or halogen, and X stands for an anion of the type contained in cyanine dye salts, e.g. chloride, bromide, iodide, perchlorate, benzene, sulphonate, toluene sulphonate, methyl sulphate, ethyl sulphate etc.; the nature of the anion is of no or practically no significance for the effectiveness of the sensitizer, and X does not exist when $L_1$, $L_2$, $R_5$ or $R_7$ itself contains an anionic group in which case the dye is a betaine dye.

By appropriate choice of the substituents and methine chain length, the characteristics of the sensitizers of the invention as regards sensitizing range, solubility, etc. can be adapted to the necessities.

The following list includes representative examples of methine dyes corresponding to one of the above general formulae. They are found to be particularly suitable for the spectral sensitization of the direct-positive silver halide emulsions.

(1) 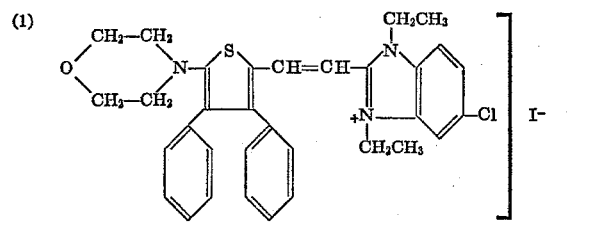

(2) 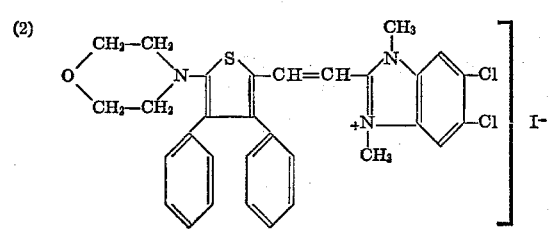

(3) 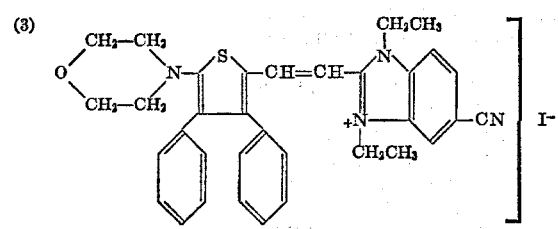

(4) 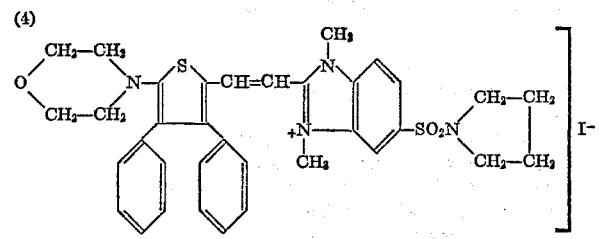

(5) 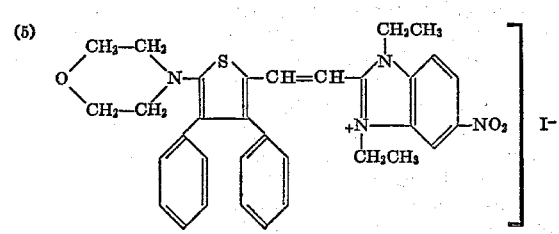

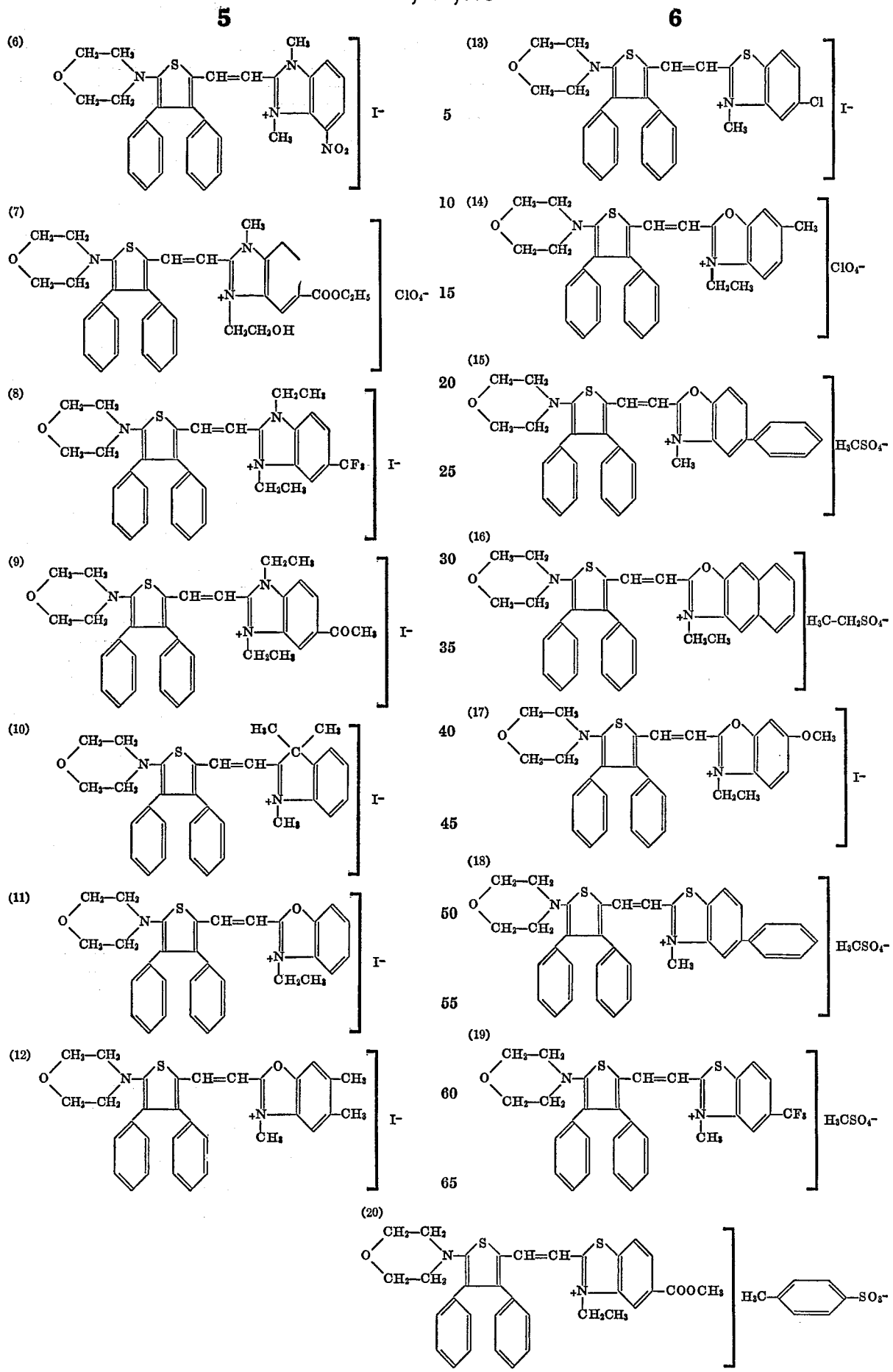

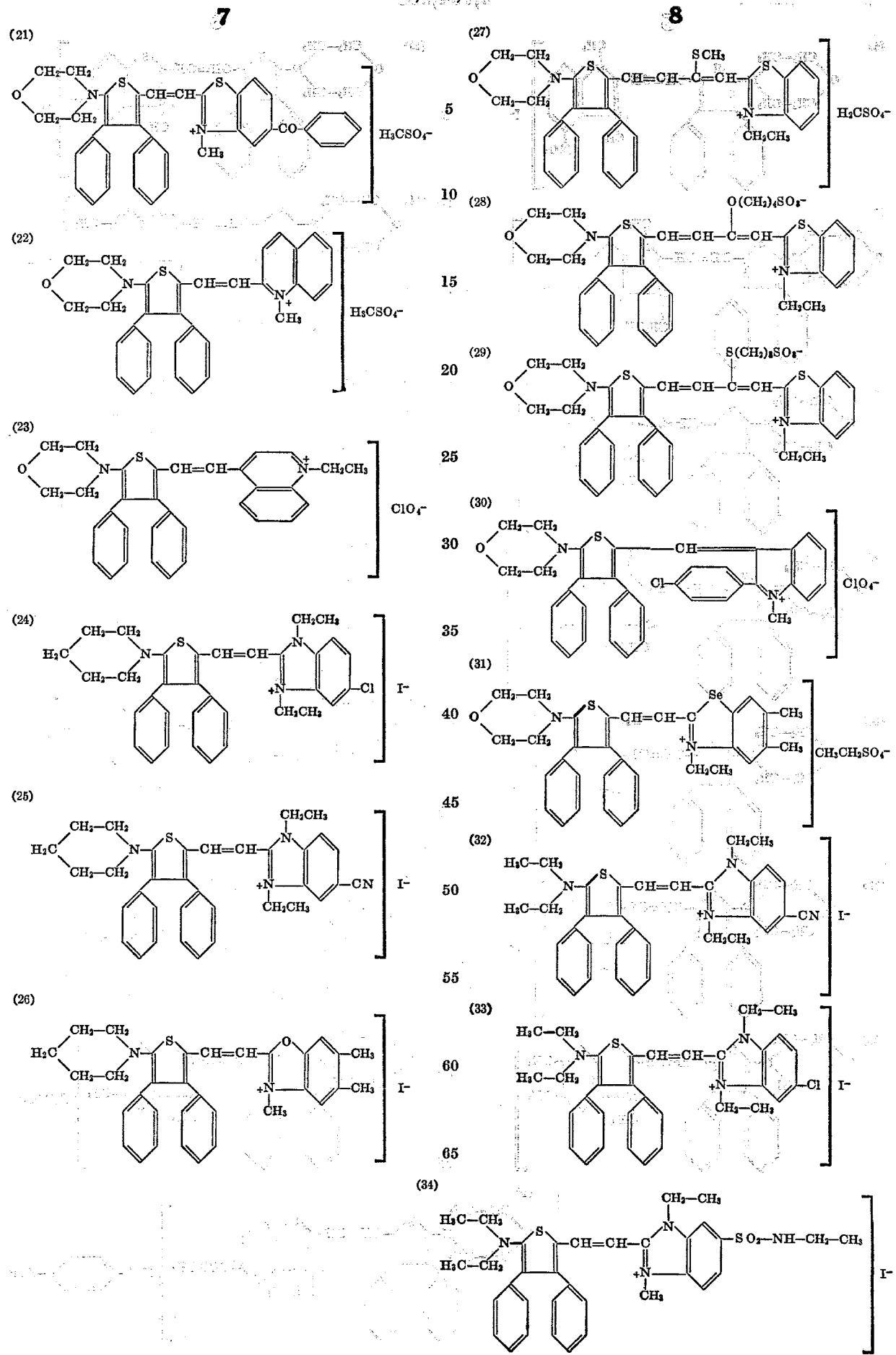

(35) 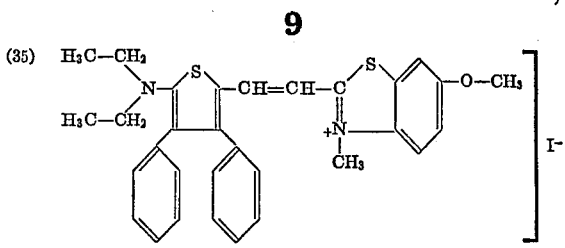

(36) 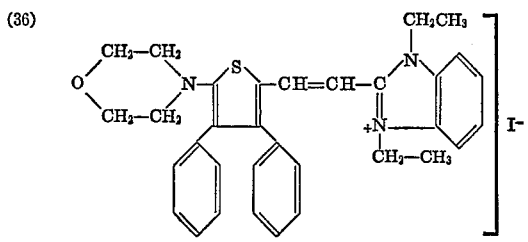

(37) 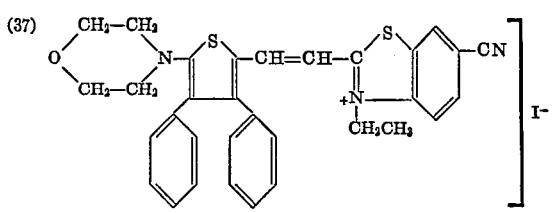

(38) 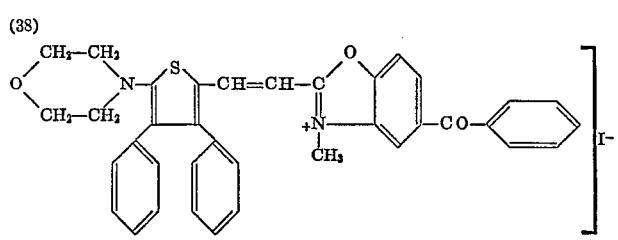

(39) 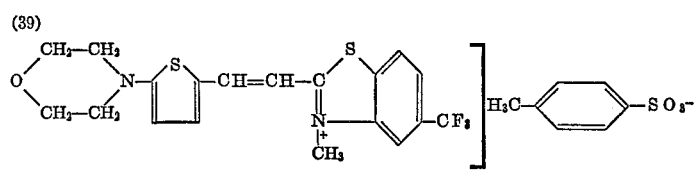

(40) 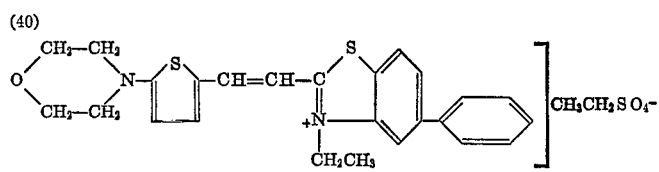

The dyes corresponding to general Formula I can be prepared by condensing a thiophene compound corresponding to the following general formula:

(III) 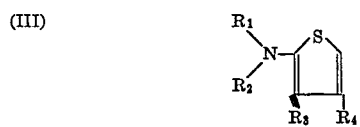

wherein:

$R_1$, $R_2$, $R_3$, and $R_4$ have the same significance as defined above, with a compound corresponding to one of the following general formulae:

(IV) 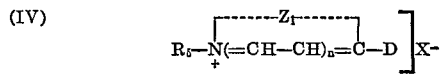

(V) 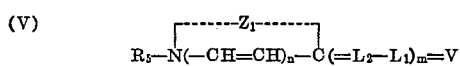

wherein:

$R_5$, $Z_1$, X, $L_1$, $L_2$, n and m have the same significance as above,

D stands for β-arylaminovinyl, δ-arylamino-1,3-butadienyl, β-alkylmercaptovinyl, β-arylmercaptovinyl, β-acetarylidovinyl, β-p-tolusulphoarylidovinyl, chlorovinyl, or alkoxyvinyl, which vinyl groups may carry a substituent, and V stands for oxygen, sulphur, selenium, or =N—R wherein R is aryl, e.g. phenylimino.

These condensations are advantageously carried out in the presence of an acid anhydride such as acetic anhydride, a basic condensing agent, e.g. a trialkylamine such as triethylamine, a dialkylaniline, or a heterocyclic tertiary amine such as pyridine, or N-alkylpiperidine, and an inert diluent, such as methanol, ethanol, methoxyethanol, acetone, acetonitrile, dimethylsulphoxide, etc.

The dyes of Formula I can also be prepared by condensing a compound of the following general formula:

(VI) 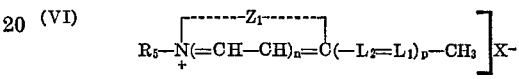

wherein:

$R_5$, $Z_1$, $L_2$, $L_1$, X and n have the same significance as above, and p stands for 0 or 1, with a compound of the following general formula:

(VII) 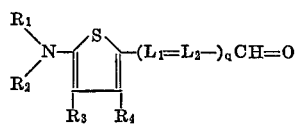

wherein:

$R_1$, $R_2$, $R_3$, $R_4$, $L_1$ and $L_2$ have the same significance as above, and q is 0 or 1 but is 0 when p is 1.

These condensations can be carried out by heating a mixture of Compounds VI and VII in the presence of an acid anhydride such as acetic anhydride. The reaction can also be carried out in an inert diluent such as methanol, ethanol, ethylene glycol monomethyl ether, acetonitrile, dimethylsulphoxide, tetrahydrothiophene-1,1-dioxide or dimethylformamide, in the presence of a basic condensing agent.

The intermediate of Formula VII with q=0 can be prepared from the corresponding thiophene compound of Formula III by a Vilsmeier and Haack reaction with dimethylformamide as formylating agent as described by Hartmann, J. Prakt. Chem. (4), 36, 50 (1967). The intermediates of Formula VII with $q=1$ can be prepared analogously with N-methylanilino-propene(1)-al(3) instead of dimethylformamide.

The methine dyes corresponding to the above general Formula II can be prepared by condensing a compound of general Formula VII wherein $q=0$, in the presence of an acid, with a compound of the following general formula:

(VIII)

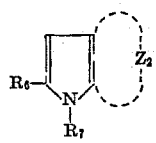

wherein:

$R_6$, $R_7$, and $Z_2$ have the same significance as above, or by condensing a compound of general Formula III, in the presence of an acid, with a compound of the following general formula:

(IX)

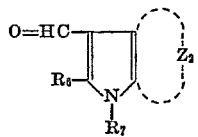

wherein:

$R_6$, $R_7$, and $Z_2$ have the same significance as defined above.

The aldehydes of Formula IX can also be prepared according to the Vilsmeier and Haack reaction as referred to above.

The following preparations illustrate how the dyes for use according to the invention were prepared.

PREPARATION 1—DYE 2

A mixture of 2-morpholino-3,4-diphenyl-5-formylthiophene (3.5 g.; 0.01 mole), 1,2,3-trimethyl-5,6-dichlorobenzimidazolium iodide (3.6 g.; 0.01 mole), methanol (70 ml.), and piperidine (1 ml.) was refluxed for 2 hours. After cooling overnight, the dye was collected with suction, dissolved in methylene chloride, filtered, precipitated with ether, and recrystallised from n-propanol.

Yield: 2.4 g.
Melting point: above 260° C.
Abs. max.: 512 mm.; $\epsilon$: $4.2 \times 10^4$ (measured in dichloroethane).

PREPARATION 2—DYE 7

A mixture of 2-morpholino-3,4-diphenyl-5-formylthiophene (3.5 g.; 0.01 mole), 1-ethyl-2-methyl-3-(2-hydroxyethyl)-5-ethoxycarbonylbenzimidazolium bromide (3.6 g.; 0.01 mole), 2-methoxyethanol (60 ml.), and piperidine (1 ml.) was refluxed for 3 hours and then evaporated under reduced pressure. The residue was refluxed with a solution of sodium perchlorate (5 g.) in methanol (25 ml.) for 10 minutes. After cooling overnight the dye was collected with suction and recrystallized from methanol.

Yield: 2.0 g.
Melting point: 200° C. (decomposition).
Abs. Max.: 460 mm.; $\epsilon$: $2.31 \times 10^4$ (measured in methanol).

PREPARATION 3—DYE 10

A mixture of 2-morpholino-3,4-diphenyl-5-formylthiophene (3.5 g.; 0.01 mole), 1,3,3-dimethylindoleninium iodide (3.3 g.; 0.01 mole) and acetic anhydride (50 ml.) was refluxed for ½ hour and then diluted with water. The precipitated dye was recrystallized from methanol (150 ml.).

Yield: 4.5 g.
Melting point: above 260° C.
Abs. max.: 588 mm.; $\epsilon$: $1.03 \times 10^5$ (measured in dichloroethane).

PREPARATION 4—DYE 11

A mixture of 2-morpholino-3,4-diphenyl-5-formylthiophene (3.5 g.; 0.1 mole), 2-methyl-3-ethylbenzoxazolium iodide (2.9 g.; 0.01 mole), and acetic anhydride (50 ml.) was refluxed for ½ hour, cooled overnight, filtered with suction, and recrystallized from ethanol.

Yield: 1.8 g.
Melting point: 230° C. (decomposition)
Abs. max.: 555 nm.; $\epsilon$: $1.23 \times 10^5$ (measured in methylene chloride).

PREPARATION 5—DYE 21

A mixture of 2-morpholino-3,4-diphenyl-5-morpholino-5-formylthiophene (2.4 g.; 0.007 mole), 2,3-dimethyl-5-benzoylbenzothiazolium methylsulphate (2.5 g.; 0.007 mole), and acetic anhydride (30 ml.) was refluxed for 1 hour, cooled, and poured into ether (200 ml.). The precipitated dye was recrystallized from ethanol.

Yield: 3.3 g.
Melting point: 150° C. (decomposition)
Abs. max.: 582 nm.; $\epsilon$: $8.8 \times 10^4$ (measured in methanol).

PREPARATION 6—DYE 22

A mixture of 2-morpholino-3,4-diphenyl-5-formylthiophene (3.5 g.; 0.01 mole), 1,2-dimethylchinolinium methylsulphate (3.95 g.; 0.01 mole), methanol (100 ml.), and piperidine (1 ml.) was refluxed for 3 hours, filtered whilst hot, and concentrated by evaporation to a volume of 30 ml. The dye was sucked off and purified by chromatography (silica gel; methylene chloride).

Yield: 2.4 g.
Melting point: 230° C.
Abs. max.: 553 nm.; $\epsilon$: $4.0 \times 10^4$ (measured in methanol).

PREPARATION 7—DYE 29

A mixture of 2-morpholino-3,4-diphenyl-5-formylthiophene (3.5 g.; 0.01 mole), anhydro-2-[2(3-sulphopropylthio)-propenyl]-3-ethylbenzothiazolium hydroxide (3.6 g.; 0.01 mole) and acetic anhydride (40 ml.) was refluxed for ½ hour and then kept cool for several days. The precipitate was collected by filtration and recrystallized from methanol.

Yield: 1.2 g.
Melting point: 280° C. (decomposition)
Abs. max.: 580 nm.; $\epsilon$: $3.25 \times 10^4$.

PREPARATION 8—DYE 30

A mixture of 2-morpholino-3,4-diphenylthiophene (3.2 g.; 0.01 mole), 1-methyl-2(4-chlorophenyl)-3-formyl-indole (2.7 g.; 0.01 mole), methanol (50 ml.), and perchloric acid 70% (2.2 ml., 0.025 mole) was refluxed for 1 hour. After cooling, the dye was collected and recrystallized from a mixture of ethanol (100 ml.) and 2-methoxyethanol (50 ml.).

Yield: 4.6 g.
Melting point: 220° C.
Abs. max.: 545 nm.; $\epsilon$: $7.7 \times 10^4$ (measured in dichloroethane).

The methods of incorporating the dyes in the emulsions are relatively simple and well known to those skilled in the art of emulsion making.

The dyes according to the present invention are usually added to the fogged silver halide emulsion in the form of a solution in a suitable solvent, e.g., water, lower alcohols such as methanol and ethanol, ketones such as acetone, amines such as triethylamine, pyridine, mixtures of these solvents and other well-known solvents known in the art. The dyes may be used with various concentrations. They are generally used in amounts comprised between about 10 mg. and about 500 mg., preferably between about 75 mg. and about 250 mg. per mole of silver halide.

The optimum concentration is dependent on the particular dye concerned and the particular emulsion used and can be determined readily by methods well known in the art.

The silver halide emulsions used may contain any of the usual silver halide salts such as silver bromide, silver iodide, silver chloride, silver bromoiodide, silver chlorobromoiodide, etc. silver bromoiodide being preferred however. The silver halide is dispersed advantageously in any of the hydrophilic colloids conventionally used in photographic light-sensitive silver halide emulsions including gelatin, colloidal albumin, zein, agar-agar, alginic acid, and derivatives thereof, a cellulose derivative or a synthetic resin, e.g. a polyvinyl compound. Colloid that can be used are polyvinyl alcohol, partially hydrolyzed cellulose esters such as cellulose acetates, polyvinyl pyrrolidone, etc.

The silver halide emulsions are fogged by exposure to light or preferably by addition of a chemical agent, which can be any reducing agent that will fog the silver halide without having an adverse effect on the emulsion. Particularly suitable reducing agents include sulphur compounds such as thiourea dioxide, tin(II) salts, e.g. tin(II) chloride, hydrazine, formaldehyde and other well-known fogging reducing agents. The emulsions can be fogged as described in United Kingdom patent specification 723,019, filed Feb. 5, 1962, by Gevaert Photo-Producten N.V., by addition thereto of a reducing agent and a compound of a metal that is more electropositive than silver such as a gold salt, e.g. potassium chloroaurate and gold(III) chloride and salts of rhodium, platinum, palladium, iridium, etc. e.g. $(NH_4)_2PdCl_6$.

In another fogging technique use is made of the fogging action of alkaline substances, e.g. sodium hydroxide or potassium hydroxide, which substances preferably are applied during the precipitation of the silver halide and the ripening.

The emulsions may further contain the usual additives such as coating aids, hardening agents, e.g. mucochloric acid, formaldehyde, etc., stabilizing agents, speed-increasing compounds, light-absorbing dyes, colour couplers, etc.

The direct-positive emulsions sensitized with dyes corresponding to the above general formula may further contain dyes of the type, which in silver halide emulsions of the negative type act as desensitizers and therefore are called desensitizing dyes. Particularly suitable for this purpose are the desensitizing dyes referred to in United Kingdom patent specification 1,155,404, filed May 9, 1966, by Gevaert-Agfa N.V., especially the nitrobenzylidene and nitrostyryl dyes described therein.

The emulsions can be coated on a wide variety of photographic supports, which include cellulose nitrate film, cellulose acetate film, cellulose acetate butyrate film, polyvinyl acetal film, polystyrene film, polyethylene terephthalate film, polycarbonate film and related films of resinous materials as well as paper including baryta-coated and olefin-coated paper, glass and others.

Any of the well known developing and fixing baths can be used in processing the exposed silver halide emulsions sensitized with the dyes of the present invention.

The following example illustrates the present invention.

EXAMPLE

A washed silver iodobromide emulsion containing per kg. 60 g. of silver halide (95 mole percent of silver bromide and 5 moles percent of silver iodide) and chemically fogged with sodium hydroxide (pH=12) during the precipitation step and subsequent heat-treatment (15 min. at 55° C. and 10 min. at 80° C.) was divided into several aliquot portions. To each of these portions one of the sensitizing dyes listed in the table below was added in an amount of 60 mg. per kg. of emulsion. Then the emulsions were coated on a cellulose triacetate support and dried. The materials were exposed in a sensitometer to white light and then developed in a common hydroquinone/p-N-methylaminophenol hemisulphate mixture and fixed. The sensitization maxima obtained with the dyes of the invention are listed in the table below.

| Spectrally sensitizing dye: | Sensitization maxima (mm.) |
| --- | --- |
| 1 | 560 |
| 2 | 590 |
| 3 | 570 |
| 4 | 560 |
| 5 | 580 |
| 6 | 580 |
| 7 | 560 |
| 8 | 560 |
| 9 | 560 |
| 10 | 610 |
| 11 | 580 |
| 12 | 590 |
| 13 | 580 |
| 14 | 590 |
| 15 | 600 |
| 16 | 600 |
| 17 | 600 |
| 18 | 620 |
| 19 | 600 |
| 20 | 600 |
| 21 | 600 |
| 22 | 630 |
| 27 | 610 |
| 28 | 600 |
| 30 | 565 |

We claim:

1. A direct-positive photographic material comprising a silver halide emulsion that has been fogged to such an extent that it produces direct-positive images upon exposure and development, said emulsion containing a dye corresponding to one of the following general formulae I and II:

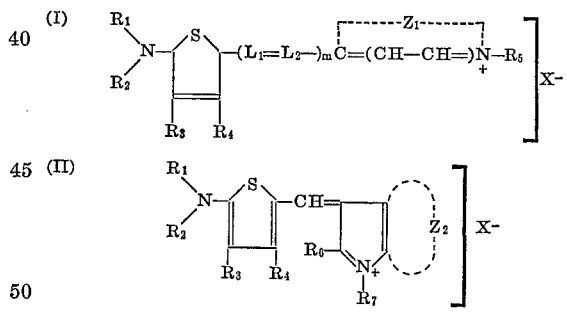

wherein:
each of $R_3$ and $R_4$ represents hydrogen, an alkyl group represent the atoms necessary to complete a morpholine, piperidine, or pyrrolidine ring,
each of $R_3$ and $R_4$ represents hydrogen, an alkyl group or an aryl group, each of $L_1$ and $L_2$ represents a methine group,
$n$ represents 0 to 1,
$m$ represents 1 or 2,
each of $R_5$ and $R_7$ represents a saturated or unsaturated aliphatic group or an aromatic group,
$R_6$ represents an aryl group, or a pyridine group,
$Z_1$ stands for the non-metallic atoms necessary to complete a 5- or 6-membered heterocyclic nucleus containing nitrogen, which nucleus may carry a fused-on benzene or naphthalene ring selected from the group consisting of thiazole, benzothiazole, naphthothiazole, thionaphtheno[7,6 - d]thiazole, oxazole, benzoxazole, naphthoxazole, selenazole, benzoselenazole, naphthoselenazole, thiazoline, oxazoline, selenazoline, 2-quinoline, 4 - quinoline, 1 - isoquinoline, 3-isoquinoline, 2-pyridine, 3,3-dialkylindolenine, and benzimidazole,
$Z_2$ represents the atoms necessary to complete a fused-on benzene ring, and X stands for an anion but is not present when $L_1$, $L_2$, $R_5$, or $R_7$ contains an anionic group.

2. A direct-positive photographic material according to claim 1, wherein the said dye is present in the said emulsion in an amount comprised between about 10 mg. and about 500 mg. per mole of silver halide.

3. A direct-positive photographic material according to claim 3, wherein the said silver halide emulsion is a silver bromoiodide emulsion.

4. A direct-positive photographic material according to claim 1, wherein the said emulsion has been fogged by means of a reducing agent.

5. A direct-positive photographic material according to claim 1, wherein the emulsion also comprises a compound of a metal that is more electropositive than silver.

6. A direct-positive photographic material according to claim 1, wherein the emulsion has been fogged by means of a reducing agent and also comprises a compound of a metal more electropositive than silver.

7. A direct-positive photographic material according to claim 1, wherein said emulsion also comprises a gold compound.

8. A direct-positive photographic material according to claim 1, wherein said emulsion has been fogged by means of a reducing agent and also comprises a gold compound.

9. A direct-positive photographic material according to claim 1, wherein the said emulsion also comprises a desensitizing dye.

10. A direct-positive photographic material according to claim 1, wherein said emulsion also comprises a desensitizing nitrobenzylidene or nitrostyryl dye.

References Cited
UNITED STATES PATENTS

| | | | |
|---|---|---|---|
| 3,023,102 | 2/1962 | Dersch et al. | 96—101 |
| 3,501,310 | 3/1970 | Illingsworth et al. | 96—101 |
| 3,567,456 | 3/1971 | Riester et al. | 96—101 |
| 3,632,349 | 1/1972 | Shiba et al. | 96—127 |
| 3,652,288 | 3/1972 | Fumia et al. | 96—120 |

J. TRAVIS BROWN, Primary Examiner

U.S. Cl. X.R.

96—127, 128, 130, 132; 260—240.1

UNITED STATES PATENT OFFICE
CERTIFICATE OF CORRECTION

Patent No. 3,764,338          Dated  October 9, 1973

Inventor(s) Henri DEPOORTER ET AL          Page 1 of 2

It is certified that error appears in the above-identified patent and that said Letters Patent are hereby corrected as shown below:

Column 2, line 6, "methne" should read -- methine --; Column 2, line 7, "following formulae" should read -- following general formulae --; Column 2, line 46, "Filmfabric" should read -- Filmfabrik --. Column 3, line 1, "(acetylsulphamyl)-proyl" should read -- (acetylsulphamyl)-propyl --; Column 3, line 45, "those of the benzoselenazole, series" should read -- those of the benzoselenazole series --. Column 6, lines 1-10, formula (13), the formula should appear as follows:

(13)
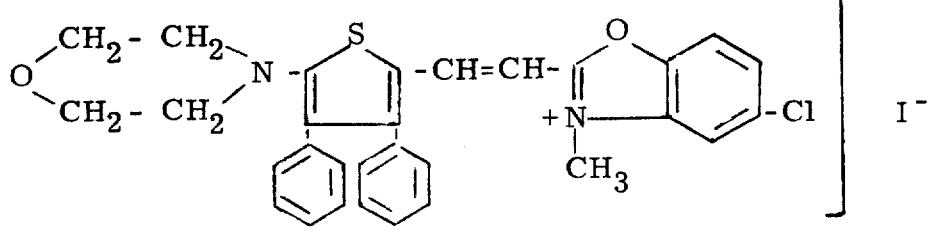

Column 10, line 72, "intermediate" should read -- intermediates --. Column 11, line 48, "512 mm." should read -- 512 nm. --; Column 11, line 63, "460 mm." should read -- 460 nm. --; Column 11, line 74, "588 mm." should read -- 588 nm. --. Column 14, lines 3 - 4, in the heading of the table, "Sensitization maxima (mm.)" should read -- Sensitization maxima (nm.) --;

UNITED STATES PATENT OFFICE
CERTIFICATE OF CORRECTION

Patent No. 3,764,338    Dated October 9, 1973

Inventor(s) Henri DEPOORTER ET AL    Page 2 of 2

It is certified that error appears in the above-identified patent and that said Letters Patent are hereby corrected as shown below:

Column 14, lines 39 - 43, formula (I) of claim 1, the formula should appear as follows:

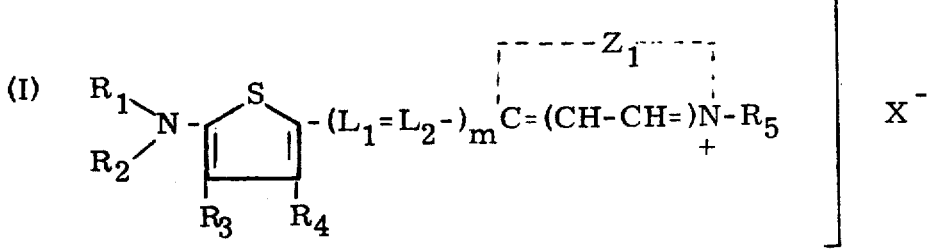

Column 14, line 53 (claim 1), "each of $R_3$ and $R_4$ represents hydrogen, an alkyl group" should read -- each of $R_1$ and $R_2$ represents $C_1$-$C_5$ alkyl or together --. Column 15, line 8 (claim 3), "claim 3" should read -- claim 1 --.

Signed and sealed this 3rd day of December 1974.

(SEAL)
Attest:

McCOY M. GIBSON JR.
Attesting Officer

C. MARSHALL DANN
Commissioner of Patents